US010333447B2

(12) United States Patent
Price

(10) Patent No.: US 10,333,447 B2
(45) Date of Patent: Jun. 25, 2019

(54) MOTOR CONTROL SYSTEM AND METHOD

(71) Applicant: NEXUS SYSTEM LTD, Ness Ziona (IL)

(72) Inventor: Paul Price, Ness Ziona (IL)

(73) Assignee: NEXUS SYSTEMS LTD, Ness Ziona (IL)

( * ) Notice: Subject to any disclaimer, the term of this patent is extended or adjusted under 35 U.S.C. 154(b) by 225 days.

(21) Appl. No.: 15/506,060

(22) PCT Filed: Nov. 27, 2015

(86) PCT No.: PCT/IL2015/051157
§ 371 (c)(1),
(2) Date: Jun. 14, 2017

(87) PCT Pub. No.: WO2016/084091
PCT Pub. Date: Jun. 2, 2016

(65) Prior Publication Data
US 2017/0244350 A1  Aug. 24, 2017

Related U.S. Application Data

(60) Provisional application No. 62/260,266, filed on Nov. 26, 2015, provisional application No. 62/085,262, filed on Nov. 27, 2014.

(51) Int. Cl.
*H02P 6/17*  (2016.01)
*H02P 21/22*  (2016.01)
(Continued)

(52) U.S. Cl.
CPC .............. *H02P 21/22* (2016.02); *G05B 19/19* (2013.01); *H02P 6/06* (2013.01); *H02P 6/10* (2013.01);
(Continued)

(58) Field of Classification Search
CPC .......... G05B 19/19; G05B 2219/35585; G05B 2219/41292; G05B 2219/41428;
(Continued)

(56) References Cited

U.S. PATENT DOCUMENTS 4,035,701 A   7/1977 Jensen
4,228,396 A   10/1980 Palombo et al.
(Continued)

FOREIGN PATENT DOCUMENTS

EP   0 206 212 B1   12/1986
EP   1 665 513 B1   6/2006

OTHER PUBLICATIONS

Libor Prokop, Leos Chalupa, "3-Phase BLDC Motor Control with Sensorless Back EMF Zero Crossing Detection Using 56F80x", Freescale Semiconductor Preliminary, 3-Phase BLDC Motor Control, AN 1914, Rev. 1, Nov. 2005, pp. 1-55.
(Continued)

*Primary Examiner* — Muhammad S Islam
(74) *Attorney, Agent, or Firm* — Gottlieb, Rackman & Reisman, P.C.

(57) ABSTRACT

A system for controlling an electric motor which includes three coils and a rotor, comprising a motion-profile-generator for generating a rotor-motion-profile and for producing a position-command, a position-controller for determining a velocity-command and a position-feedforward, for determining a forward-velocity according to the prediction of the velocity required to reach said position-command. The system further includes a first summer for producing a modified velocity, a velocity controller, for determining a current-command, a velocity feedforward, for determining a forward-current and a second summer for producing a modified-current. The system also includes a commutator, for determining respective modified-coil-currents for each of at
(Continued)

least three current-control-loops and for dividing said modified-coil-currents between the said current-control-loops according to the position of said rotor. Each current-control-loop includes a current-controller, for determining a respective voltage-command for the respective coil thereof an h-bridge for providing said voltage command to the respective coil thereof.

10 Claims, 11 Drawing Sheets

(51) Int. Cl.
    *H02P 6/10*         (2006.01)
    *G05B 19/19*       (2006.01)
    *H02P 6/06*         (2006.01)
    *H02P 23/00*       (2016.01)
    *H02P 7/03*         (2016.01)

(52) U.S. Cl.
    CPC ............ *H02P 7/04* (2016.02); *H02P 23/0004* (2013.01); *G05B 2219/35585* (2013.01); *G05B 2219/41292* (2013.01); *G05B 2219/41428* (2013.01)

(58) Field of Classification Search
    CPC ........ H02P 21/22; H02P 23/0004; H02P 6/06; H02P 6/10; H02P 7/04
    See application file for complete search history.

(56) References Cited

U.S. PATENT DOCUMENTS

| | | | |
|---|---|---|---|
| 5,410,234 A | | 4/1995 | Shibata et al. |
| 5,442,276 A | | 8/1995 | Schwartz et al. |
| 5,543,696 A | * | 8/1996 | Huggett .............. H02P 6/06 318/590 |
| 5,757,596 A | | 5/1998 | Weber et al. |
| 5,777,447 A | * | 7/1998 | Okano .............. H02P 21/06 318/400.11 |
| 6,232,731 B1 | | 5/2001 | Chapman |
| 6,408,240 B1 | | 6/2002 | Morrell et al. |
| 6,784,632 B2 | | 8/2004 | Tomita |
| 6,879,128 B2 | | 4/2005 | Coutu et al. |
| 7,271,993 B2 | | 9/2007 | Plojhar et al. |
| 7,606,624 B2 | | 10/2009 | Cullen |
| 7,782,006 B2 | | 8/2010 | Misumi et al. |
| 7,821,219 B2 | | 10/2010 | Ishii |
| 7,834,565 B2 | | 11/2010 | Armstrong |
| 8,228,020 B2 | | 7/2012 | Shin et al. |
| 2004/0135534 A1 | * | 7/2004 | Cullen .............. G05B 17/02 318/609 |
| 2008/0067960 A1 | | 3/2008 | Maeda et al. |
| 2011/0169442 A1 | | 7/2011 | Birumachi |
| 2014/0267778 A1 | | 9/2014 | Webb et al. |

OTHER PUBLICATIONS

A. Kolli, O. Béthoux, A. De Bernardinis, E. Labouré, G. Coquery, "Space Vector PWM Control Synthesis for a H-Bridge Drive in Electric Vehicles", Author manuscript in journal *IEEE Transactions on Vehicular Technology 62*, 6 (2013) 2441,245,, hal 00953792, version 1-3 Mar. 2014.

Jianwen Shao, "Direct Back EMF Detection Method for Sensorless Brushless DC (BLDC) Motor Drives," Thesis Submitted to the Faculty of the Virginia Polytechnic Institute and the State University in partial fulfillment of the requirements for the degree of Master of Science in Electrical Engineering, Sep. 2003, pp. 1-83, Blacksburg, Virginia.

Steven Keeping, "Controlling Sensorless, BLDC Motors via Back EMF", Contributed by ElectronicProducts.com, https://www.digikey.co.il/en/articles/techzone/2013/jun/controlling%ADsensorless%ADbldc%ADmotors%ADvia%ADback%ADemf1/9 , Digi-Key Electronics, Jun. 19, 2013, pp. 1-9.

George W. Younkin, P.E., "Current Feedfoward Control," Life Fellow, IEEE, Bullseye Research, Inc—Industrial Control Div., Fond du Lac, Wisconsin, pp. 1-20.

Lemmens Joris, Vanvlasselaer Kris, Mulier Kristof, Goossens Stijn, Symens Wim, Driesen Johan, "Efficiency Improvement of a High Dynamic BLDC Linear Motor by Multiphase Control," in *IEEE journal* 978-1-4799-0336-8/13/$31.00, Jan. 1, 2013, pp. 1191-1196.

Dave Wilson, "Motor Control Compendium", http://focus.ti.com/download/tmg/docs/c2000/TI_MotorControlCompendium_2010.pdf; 2010-2011.

Narasimham PVRL, Sarnia AVRS, Vargil Kumar E., "A Novel H-Bridge Topology to Drive Spindle Motor at High Speed with High Starting Torque", *Journal of Electrical Engineering*: vol. 11/2011— Edition: 3, www.jee.ro, pp. 1-7.

R. H. Park, "Two-reaction theory of synchronous machines generalized method of analysis—part I", NAPS, University of Waterloo, Canada, Transactions A.I.E.E., Oct. 23-24, 2000, pp. 7-16-730, P-81-P-95.

Shane Colton, "FFv1.1 Air: ClosedLoop RPM Testing", http://scolton.blogspot.co.il/2012/08/ffv11-air-closed-loop-rpm-testing.html, Aug. 13, 2012, pp. 1-9.

Dorin O. Neacsu, "Space vector modulation—An introduction", Proc. IEEE Annu. Industrial Electronics Soc. Conf., IECON'01: The 27$^{th}$ Annual Conference of the IEEE Industrial Electronics Society, 0-7803-7108-9/01, Nov./Dec. 2001, pp. 1583-1592.

Bjarke Kleif, Steffen T. Rasmussen, "Supervisory Control of a. Dual-Direct-Drive Electrical Vehicle",Thesis submitted to the Department of Electronic Systems in partial fulfillment of the requirements for the Degree ofMaster of Science in Control Engineering, Aalborg University, Denmark 2012.

Muhammad Ashraf Khan, Ivana Todić, Marko miloš, Zoran stefanović and Đorđe blagojević, "Control of Electro-Mechanical Actuator for Aerospace Applications", Strojarstvo 52 (3) 2010, pp. 303-313.

PCT Search Report and Written Opinion, PCT/IL2015/051157, U.S. Patent and Trademark Office, dated May 11, 2016.

* cited by examiner

MOTOR CONTROL SYSTEM AND METHOD

FIELD OF THE DISCLOSED TECHNIQUE

The disclosed technique relates to electric motors in general, and to system methods for controlling electric motors, in particular.

BACKGROUND OF THE DISCLOSED TECHNIQUE

Electric motors are widely employed in various field of technology such as robotics, industrial machines, toys, tracking systems, electric vehicles, vehicle subsystems (e.g., power steering subsystems). Controlling the electric motor, for example, to reach a target position, to spin at a target velocity or to provide a target torque, has long been a challenge. Electric motor control systems and methods may control any one of the position, the velocity or torque of the motor or any combination thereof the position, the velocity and torque.

U.S. Pat. No. 5,410,234 to Shibata et al, entitled "Motor Drive Control Apparatus", directs to a motor control system for controlling the position of a motor where the coils are connected in a star configuration. In system directed to by Shibata, the current position of the motor is subtracted from a position command to determine a positional error amount. A speed command is generated in a speed command calculation section according to the positional error. Furthermore, the current speed of the motor is determined in a speed detecting section. A speed error is determined by subtracting the current speed from the speed command. A torque command determined employing a proportional plus integral control calculation with respect to the speed error in a speed calculation section. A phase current command calculation section determines command values of the currents for two of the phase windings (i.e., since when the coils are connected in a star configuration the current in the third phase is the sum of the currents in the other two phases). Also a current detector determines feedback currents for the two phases, and the difference between the feedback currents and the currents command generates a current error. The current errors subjected to a proportional plus integral control calculation, the current of the third coil is determined and a PWM control section determines the voltages to be imposed on each coil. These voltages are then amplified and provided to the coils. The system directed to by Shibata further includes at least a current feedforward which generates a voltage added to the respective voltages of the phases according to current command values and an impedance model of the motor. The system directed to by Shibata further includes a torque feedforward and a position feedforward.

SUMMARY OF THE PRESENT DISCLOSED TECHNIQUE

It is an object of the disclosed technique to provide a novel method and system for controlling an electric motor. In accordance with the disclosed technique, there is thus provided a system for controlling an electric motor. The electric motor includes at least three coils and a rotor. The system includes a motion profile generator, a position controller, a position feedforward and a first summer. The system further includes a velocity controller, a velocity feedforward, a second summer and a commutator. The system also includes at least three current control loops, each being associated with a respective one of the at least three coils of the motor. Each current control loop includes a current controller and an H-bridge for each coil.

The motion profile generator generates a rotor motion profile and for produces a position command according to the rotor motion profile. The position controller, coupled with the motion profile generator, determines a velocity command aimed at minimizing the position error between the current position of the rotor and the position command. The position feedforward, coupled with the motion profile generator, determines a forward velocity according to the prediction of the velocity required to reach the position command. The first summer, coupled with the position controller and with the position feedforward, produces a modified velocity according to the velocity command and the forward velocity. The velocity controller, coupled with the first summer, determines a current command aimed at minimizing the velocity error between the instantaneous velocity or the rotor and the modified velocity. The velocity feedforward, coupled with the first summer, determines a forward current according to the prediction of the current required to reach the modified velocity. The second summer, coupled with the velocity controller and with the velocity feedforward, for produces a modified current according to the current command and the forward current. The commutator, coupled with the second lines a respective modified coil current each current control loop. The commutator further divides the modified coil currents between the current control loops according to the position of the rotor. In each current control loop, the current controller, coupled with the commutator, determines a respective voltage command for the respective coil thereof aimed at minimizing the current error between the instantaneous current flowing through the respective one of the at least three and the respective modified coil current. The h-bridge, coupled with the current controller, provides the voltage command to the respective coil thereof.

In accordance with another embodiment of the disclosed technique, there is thus provided a system for controlling an electric motor, the electric motor including at least three coils and a rotor. The system includes a motion profile generator, a position controller, a position feedforward and a first summer. The system further includes a velocity controller, a velocity feedforward, a second summer and a current controller. The system also includes a commutator and at least three an h-bridges. The motion profile generator, generates a rotor motion profile, and for producing a position command according to the rotor motion profile. The position controller, coupled with the motion profile generator, determines a velocity command aimed at minimizing the position error between the current position of the rotor and the position command. The position feedforward, coupled with the motion profile generator, determines a forward velocity according to the prediction of the velocity required to reach the position command. The first summer coupled with the position controller and with the position feedforward produces a modified velocity according to the position command and the forward velocity. The velocity controller, coupled with the first summer, determines a current command aimed at minimizing the velocity error between the instantaneous velocity of the rotor and the modified velocity. The velocity feedforward, coupled with the first summer, for determines a forward current according to the prediction of the current required to reach the modified velocity. The second summer, coupled with the velocity controller and with the velocity feedforward, produces a modified current according to the current command and the forward current.

The current controller, coupled with the commutator, determines a respective voltage command aimed at minimizing the current error between the instantaneous current flowing through the respective coils and the modified current. The commutator, coupled with the second current controller, determines a respective voltage for each coil and dividing the voltages between the at least three coils. Each h-bridges, coupled with a respective coil and with the commutator, for provides the voltage command to the respective coil thereof.

BRIEF DESCRIPTION OF THE DRAWINGS

The disclosed technique will be understood and appreciated more fully from the following detailed description taken in conjunction with the drawings in which.

DETAILED DESCRIPTION OF THE EMBODIMENTS

The disclosed technique overcomes the disadvantages the prior art by providing a motor control system and method in which each coil in the motor is independently controlled (i.e., the coils are not connected therebetween) and includes a position feedforward and a velocity feedforward. Furthermore, the current control loop may include a current feedforward. According to one embodiment, the motor control system includes, for each coil, a respective different current control loop associated therewith. The motor control system may particularly be employed in application where the rotor is to reach a target position relatively accurately and in a short time (e.g., in tracking systems).

Figure 1:
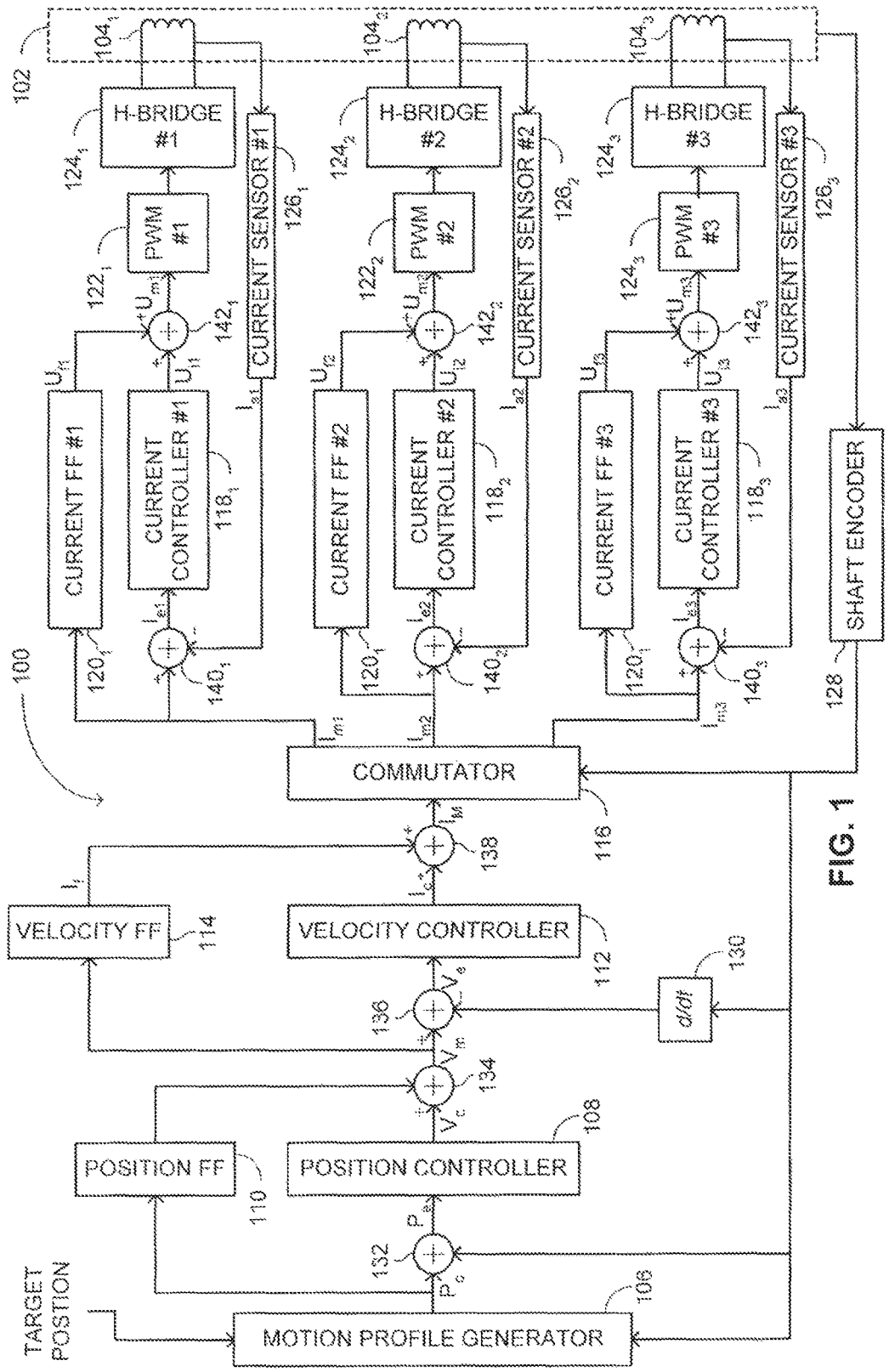
FIG. 1 is a schematic illustration of a motor control system constructed and operative in accordance with an embodiment of the disclosed technique.

Reference is now made to FIG. 1, which is a schematic illustration of a motor control system, generally referenced 100, constructed and operative in accordance with an embodiment of the disclosed technique. System 100 controls a motor 102 which includes at least three coils $104_1$, $104_2$ and $104_3$. System 100 includes a motion profile generator 106, a position controller 108, a position feedforward (abbreviated 'FF' in FIG. 1) 110, a velocity controller 112, a velocity feedforward 114 and a commutator 116. System 100 further includes summers 132, 134, 136 and 138. System 100 also includes a current controller $118_1$, a current feedforward $120_1$, a Pulse Width Modulator (PWM) $122_1$, an H-bridge $124_1$, a current sensor $126_1$ and summers $140_1$, $142_1$ all associated with coil $104_1$. Additionally, system 100 includes a current controller $118_2$, a current feedforward $120_2$, a Pulse Width Modulator (PWM) $122_2$, an H-bridge $124_2$, a current sensor $126_2$ and summers $140_2$ and $142_2$ all associated with coil $104_2$. Furthermore, system 100 includes a current controller $118_3$, a current feedforward $120_3$, a Pulse Width Modulator (PWM) $122_3$, an H-bridge $124_3$, a current sensor $126_1$ and summers $140_3$ and $142_3$ all associated with coil $104_3$. System 100 also includes a shaft encoder 128 and a derivative determinator (abbreviated 'd/dt' in FIG. 1) 130. Derivative determinator 130 may be omitted or replaced with an integrator depending on the output of shaft encoder 128 as further explained below. It is noted that PWMs $122_1$, $122_2$ and $122_3$ are optional and current controllers $118_1$, $118_2$ and $118_3$ and current feedforwards $120_1$, $120_2$ and $120_3$ provide a PWM voltage signal. It is further noted that current feedforwards current feedforwards $120_1$, $120_2$ and $120_3$ are also optional. Also, summer 132 and summer 134 may each be located within position controller 108. Similarly, summer 136 and summer 138 may each be located within velocity controller 112. Also, each one of summers $140_1$, $140_2$ and $140_3$ and each one of summers $142_1$, $142_2$ and $142_3$ may be located within the respective current controller $118_1$, $118_2$, and $118_3$ thereof. Also, motion profile generator 106, position controller 108, position feedforward 110, velocity controller 112, velocity feedforward 114, commutator 116, current controllers $118_1$, $118_2$ and $118_3$, current feedforwards $120_1$, $120_2$ and $120_3$, PWMs $122_1$, $122_2$ and $122_3$ and summers 134, 134, 138, $140_1$, $140_2$ $140_3$, $142_1$, $142_2$ and $142_3$ may ail be implemented with one of a digital controller a single Digital Signal Processor (DSP), discrete components or any combination thereof.

Summer 132 is coupled with motion profile generator 106, with position controller 108 and with shaft encoder 128. Motion profile generator 106 is further coupled with position feedforward 110 and with shaft encoder 126. Summer 134 is coupled with position controller 108, with position feedforward 110, with summer 136 and with velocity feedforward 114. Summer 136 is further coupled velocity controller 112 and with derivative determinator 130. Summer 138 is coupled with velocity controller 112, with velocity feedforward 114 and with commutator 116. Commutator 116 is further coupled with each one of current feed forwards $120_1$, $120_3$ and $120_3$ and with each one of summers 140, $140_3$ and $140_3$ and with shaft encoder 126.

Summer $140_1$ is coupled with current controller $118_1$ and with current sensor $126_1$. Current sensor $126_1$ is further coupled with coil $104_1$. Summer $142_1$ is coupled with current controller $118_1$, with current feedforward $120_1$ and with PWM $122_1$. H-bridge $124_1$, is coupled with coil $104_1$ and with PWM $122_1$. Summer $140_1$, current controller $118_1$, current feedforward $120_1$ current sensor $126_1$, current controller $118_1$, summer $142_1$, PWM $122_1$ and H-bridge $124_1$ all define a respective current control loop associated with coil $104_1$.

Summer $140_2$ is coupled with current controller $118_2$ and with current sensor $126_2$. Current sensor $126_2$ is further coupled with coil $104_2$. Summer $142_2$ is coupled with current controller $118_2$, with current feedforward $120_2$ and with PWM $122_2$. H-bridge $124_2$ is coupled with coil $104_2$ and with PWM $122_2$. Summer $140_2$, current controller $118_2$, current feedforward $120_2$, current sensor $126_2$, current controller $118_2$, summer $142_2$, PWM $122_2$ and H-bridge $124_2$ all define a respective current control loop associated with coil $104_2$.

Summer $140_3$ is coupled with current controller $118_3$ and with current sensor $126_3$. Current sensor $126_3$ is further coupled with coil $104_3$. Summer $142_3$ is coupled with current controller $118_3$, with current feedforward $120_3$ and with PWM $122_3$. H-bridge $124_3$ is coupled with coil $104_3$ and with PWM $122_3$. Summer $140_3$, current controller $118_3$, current feedforward $120_3$, current sensor $126_3$, current controller $118_3$, summer $142_3$, PWM $122_3$ and H-bridge $124_3$ all define a respective current control loop associated with coil $104_3$.

Motion profile generator 106 receives a target rotor position (e.g., from a user or from a motion control system) and the current rotor position from shaft encoder 128 and generates a rotor motion profile. This rotor motion profile describes the positions of the rotor, from the current rotor position to the target position, as a function of time. Motion profile generator 106 determines the rotor motion profile before the beginning of the motion of the rotor. Alternatively, for each time step motion profile generator 106 determines the position to which the rotor should reach at the next time step. Motion profile generator 106 determines the rotor motion profile according to the difference between the current position and the target position, information relating to the motor acceleration and deceleration as well as to the maximum speed of the motor. For each time step, motion profile generator 106 provides a position command, $P_c$ (i.e., the position to which the rotor should reach at the current time step according to the rotor motion profile) to summer 132 and position feedforward 110. Summer 132 receives the current position of the rotor from shaft encoder 128 and subtracts the current position of the rotor from the position command to produce a position error $P_e$ and provides the position error to positions controller 108. Position controller 108 determines a velocity command, $V_c$, aimed at minimizing the position error. Position feedforward 110 determines a forward velocity, $V_f$, according to the prediction of the velocity required to reach the position command $P_c$ (e.g., according to a scaled time derivative of the position command). In other words, position feedforward 110 provides the required velocity had an open loop control system been employed. Summer 134 adds the forward velocity to the velocity command and generates a modified velocity signal $V_m$. Summer 134 provides the modified velocity to summer 136 and to velocity feedforward 114.

Summer 136 receives the instantaneous velocity of the rotor from derivative determinator 130 and subtracts this instantaneous velocity from the modified velocity to produce a velocity error $V_e$. Summer 136 provides the velocity error to velocity controller 108. Velocity controller 108 determines a current command, $I_c$, aimed at minimizing the velocity error. Velocity feedforward 114 determines a forward current, $I_f$ according to the prediction of the current required to reach the modified velocity $V_M$. In other words, velocity feedforward 114 provides required current had an open loop control system been employed. Velocity feedforward 114, determines a forward current, $I_f$ according to the required acceleration required to reach $V_m$ (i.e., a time derivative of $V_m$), the motor load inertia and the motor torque constant. Summer 138 adds the forward current to the current command and generates a modified current signal $I_m$. Summer 238 provides the modified current to commutator 116. Commutator 116 determines the respective modified coil currents $I_{m1}$, $I_{m1}$ and $I_{m3}$ for each respective current control loop associated with each one of coils $104_1$, $104_2$ and $104_3$. Commutator 116 divides the modified coil current $I_{m1}$, $I_{m2}$ and $I_{m3}$ between the respective current control loops of coils $104_1$, $104_2$ and $104_3$ according to the rotor position received from shaft encoder 128 (i.e., shaft encoder 128 determines the position of the rotor). Commutator 116 provides modified current $I_{m1}$ to summer $140_1$, modified current $I_{m2}$ to summer $140_2$ and modified current $I_{m3}$ to summer $140_3$.

Each one of summer $140_1$, $140_2$ and $140_3$ receives the respective instantaneous current flowing through the respective coil $104_1$, $104_2$ and $104_3$, from the respective current sensor $126_1$, $126_2$ and $126_3$ and subtracts this instantaneous current from the respective modified current $I_{m1}$, $I_{m2}$ and $I_{m3}$ to produce a respective current error $I_{e1}$, $I_{e2}$ and $I_{e3}$. Each one of current controllers $118_1$, $118_2$ and $118_3$ determines a respective voltage command, $U_{c1}$, $U_{c2}$ and $U_{c3}$, aimed at minimizing the current errors. Each one of current feedforwards $120_1$, $120_2$ and $120_3$ determines a respective forward voltage $U_{f1}$, $U_{f2}$ and $U_{f3}$ according to the prediction of the voltage required to reach the respective modified current $I_{m1}$, $I_{m2}$ and $I_{m3}$. Each one of current feedforwards $120_1$, $120_2$ and $120_3$ determines the respective forward voltage $U_{f1}$, $U_{f2}$ and $U_{f3}$ according to the respective modified current $I_{m1}$, $I_{m2}$ and $I_{m3}$, the motor electrical parameters (e.g., resistance inductance and the Back Electromotive Force—BEMF constant) and the required electrical velocity of the motor (i.e., mechanical velocity divided by the number of magnetic poles of the motor). Each one of summers $142_1$, $142_2$ and $142_3$ adds the respective forward voltage $U_{f1}$, $U_{f2}$ and $U_{f3}$ to the respective command voltage $U_{c1}$, $U_{c2}$ and $U_{c3}$ and generates a respective modified voltage $U_{m1}$, $U_{m2}$ and $U_{m3}$. Each one of summers $142_1$, $142_2$ and $142_3$ provides the respective modified voltage $U_{m1}$, $U_{m2}$ and $U_{m3}$ to the respective one of PWMs $122_1$, $122_2$ and $122_3$. Each one of PWMs $122_1$, $122_2$ and $122_3$ determines a pulse width modulated signal corresponding to the respective one of modified voltages $U_{m1}$, $U_2$ and $U_3$, which operates the respective one of H-bridges $124_1$, $124_2$ and $124_3$. Each one of H-bridges $124_1$, $124_2$ and $124_3$ provides the respective modified voltages $U_{m1}$, $U_{m2}$ and $U_{m3}$ thereof to the respective one of coils $104_1$, $104_2$ and $104_3$ at the required polarity based on the required operation mode of the motor (e.g., rotate clockwise, rotate counter-clock-wise or stand-still). As mentioned above, PWMs $122_1$, $122_2$ and $122_3$ are optional and current controllers $118_1$, $118_2$ and $118_3$ and current feedforwards $120_1$, $120_2$ and $120_3$ produce a PWM voltage signal.

Position controllers 108, velocity controller 112 and current controllers $118_1$, $118_2$ and $118_3$ described above may each be embodied as a polynomial controller such as a Proportional-Integral-Derivative (PID) controller. Generally, the controller parameters of each of position controllers 108, velocity controller 112 and current controllers $118_1$, $118_2$ and $118_3$ are determined to match the required motor performance (e.g., by employing system simulation methods or trial error methods). For example, when a PID controller is employed, initially the integral and derivative coefficients are held at zero and the proportional coefficient is increased until oscillation occurs (i.e. either in the actual system or in a system simulation) and then reduced (e.g., to a value between 70% and 80% of the oscillation value). The integral coefficient, which reduces the steady-state error, is determined similarly to the proportional coefficient. The derivative coefficient is determined based on system requirements (e.g., settling time and allowed overshoot). Each of current sensors $126_1$, $126_2$ and $126_3$ may be a direct current sensor (e.g., shunt sensor) or an indirect current sensor (e.g., a Hall effect sensor). Shaft encoder 128 may be embodied as a mechanical encoder, an optical encoder a magnetic encoder (e.g., Hall effect encoder), an inertial encoder (e.g., an Inertial Measurement Unit—IMU) or a capacitive encoder located directly on the rotor or read the rotor indirectly.

Figure 2:
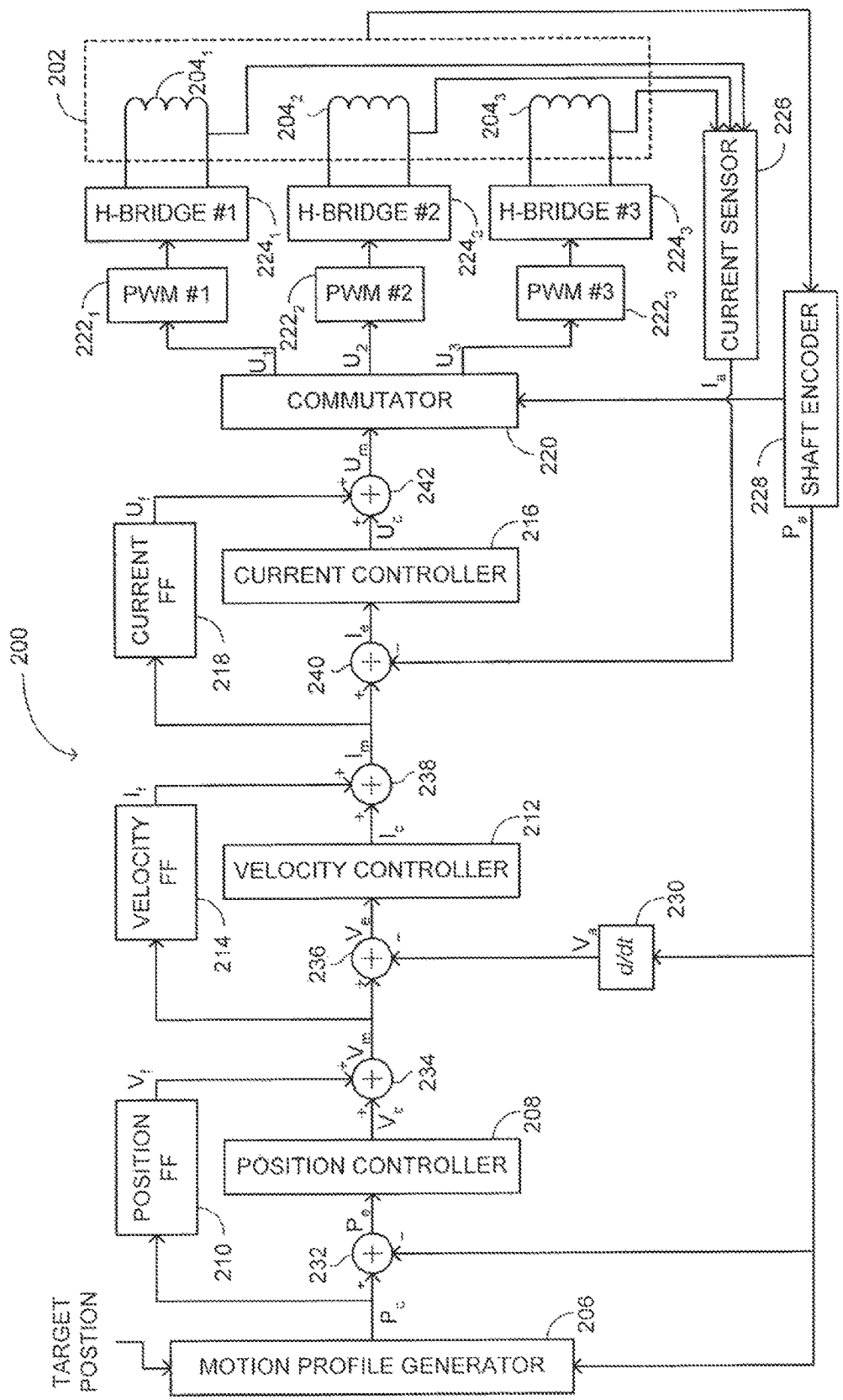
FIG. 2 is a schematic illustration of a motor control system constructed and operative in accordance with another embodiment of the disclosed technique.

Reference is now made to FIG. 2, which is a schematic illustration of a motor control system, generally referenced 200, constructed and operative in accordance with another embodiment of the disclosed technique. System 200 controls a motor 202 which includes at least three coils $204_1$, $204_2$ and $204_3$. System 200 includes a motion profile generator 206, a position controller 208, a position feedforward (abbreviated 'FF' in FIG. 2) 210, a velocity controller 212, a velocity feedforward 214, a current controller 216 and a current feedforward 218. System 200 further includes a commutator 120, at least three PWM generators $222_1$, $222_2$ and $222_3$ respective of each of coils $204_1$, $204_2$ and $204_3$ at least three H-bridges $224_1$, $224_2$ and $224_3$ respective of each of coils $204_1$, $204_2$ and $204_3$, a current sensor 226, a shaft encoder 228 and a derivative determinator (abbreviated 'd/dt' in FIG. 2) 230. System 200 also includes summers 232, 234, 236, 238, 240 and 242. It is noted that PWMs $222_1$, $222_2$ and $122_3$ are optional. It is further noted that current feedforward 218 is also optional. Also, summer 232 and summer 234 may each be located within position controller 108. Similarly, summer 236 and summer 238 may each be located within velocity controller 112. Also, summer $240_1$ and summer 142 may each be located within current controller 116.

Summer 232 is coupled with motion profile generator 206 with position controller 208 and with shaft encoder 228. Motion profile generator 206 is further coupled with position feedforward 210 and with shaft encoder 228. Summer 234 is coupled with position controller 208, with position feedforward 210, with summer 236 and with velocity feedforward 214. Summer 236 is further coupled with derivative determinator 230 and with velocity controller 212. Summer 238 is coupled with velocity controller 212, with velocity feedforward 214, with summer 240 and with current feedforward 218. Summer 240 is further coupled with current controller 226 and with current sensor 226. Summer 242 is coupled with current controller 216, with current feedforward 218 and with commutator 220. Each one of PWM generator $222_1$, $222_2$ and $222_3$ is coupled with commutator 220 and with a respective one of H-bridges $224_1$, $224_2$ and $224_3$. The two terminals of each one of coils $204_1$, $204_2$ and $204_3$ is coupled with a respect one of H-bridges $224_1$, $224_2$ and $224_3$. Each one of coils $204_1$, $204_2$ and $204_3$ is further coupled with current sensor 226. Shaft encoder 228 is further coupled with derivative determinator 230 and with the rotor of motor 202 and with commutator 220. It is noted that derivative determinator 230 may be omitted or replaced with an integrator depending on the output of shaft encoder 228 as further explained below. It is also noted that one of coils $204_1$, $204_2$ and $204_3$ is independently controller by the respective one of H-bridges $224_1$, $224_2$ and $224_3$ coupled therewith. Also, motion profile generator 206, position controller 208, position feedforward 210, velocity controller 212, velocity feedforward 214, commutator 220, current controllers 218, current feedforwards 220, PWMs $222_1$, $222_2$ and $222_3$ and summers 232, 234, 230, 238, 240 and 242 may all be implemented with one of a digital controller, a DSP, discrete components or any combination thereof.

Motion profile generator 206 receives a target rotor position (e.g., from a user or for a motion control system) and the current rotor position from shaft encoder 228 (i.e., shaft encoder determines the position of the rotor) and generates a rotor motion profile. This rotor motion profile describes the rotor position, from the current rotor position to the target position, as a function of time. Motion profile generator 206 determines the rotor motion profile according to the difference between the current position and the target position, information relating to the motor acceleration and deceleration as well as to the maximum speed of the motor. For time step, motion profile generator 206 provides a position command, $P_c$ (i.e., the position to which the rotor should reach at the current time step) to summer 232 and position feedforward 210. Summer 232 receives the current position of the rotor encoder 228 and subtracts the current position of the rotor from the position command to produce a position error $P_e$. Position controller 208 determines a velocity command, $V_c$, aimed at minimizing the position error. Position feedforward 210 determines a forward velocity signal, $V_f$ according to the prediction of the velocity required to reach the position command $P_c$ (e.g., a scaled time derivative of the position command). In other words, position feedforward 210 provides the required velocity had an open loop control system been employed. Summer 234 adds the forward velocity to the velocity command and generates a modified velocity signal $V_m$. Summer 234 provides the modified velocity to summer 236 and to velocity feedforward 214.

Summer 236 receives the instantaneous velocity of the rotor from derivative determinator 230 and subtracts this instantaneous velocity from the modified velocity to produce a velocity error $V_e$. Velocity controller 208 determines a current command, $I_c$, aimed at minimizing the velocity error. Velocity feedforward 214 determines a forward current, $I_f$ according to the prediction of the current required to reach the modified velocity $V_c$. In other words, velocity feedforward 214 provides required current had an open loop control system been employed (i.e., similar to velocity feedforward 114 of FIG. 1) described above. Summer 238 adds the forward current to the current command and generates a modified current signal $I_m$. Summer 238 provides the modified current to summer 240 and to current feedforward 218.

Summer 240 receives the instantaneous current in the coil from current sensor 226 and subtracts this instantaneous current from the modified current to produce a current error $I_e$. Current controller 216 determines a voltage command, $U_c$, aimed at minimizing the current error. Current feedforward 218 determines a forward volates, $U_f$ according to the prediction of the voltage required to reach the modified current. Current feedforwards 218 determines the respective forward voltage $U_f$ according to the modified current, $I_m$, the motor electrical parameters (e.g., resistance inductance and capacitance) and the required electrical velocity of the motor. Summer 242 adds the forward voltage to the command voltage and generates a modified voltage $U_m$. Summer 242 provides the modified voltage to commutator 220.

Commutator 220 determines three voltages $U_1$, $U_2$ and $U_3$ for each one of coils $204_1$, $204_2$ and $204_3$ and divides the voltages $U_1$, $U_2$ and $U_3$ respective of each of coils $204_1$, $204_2$ and $204_3$ according to the rotor position received from shaft encoder 228. Commutator 220 provides each of voltages $U_1$, $U_2$ and $U_3$ to a respective Pulse Width Modulator (abbreviated PWM in FIG. 2) $222_1$, $222_2$ and $222_3$. Each one of PWMs $222_1$, $222_2$ and $222_3$ determines a pulse width modulated signal corresponding to the respective one of voltages $U_1$, $U_2$ and $U_3$ which operates the respective one of H-bridges $224_1$, $224_2$ and $224_3$. Each one of H-bridges $224_1$, $224_2$ and $224_3$ provides the respective one of voltages $U_1$, $U_2$ and $U_3$ to the respective one of coils $204_1$, $204_2$ and $204_3$ at the required polarity based on the required operation mode of the motor. As mentioned above, PWMs $222_1$, $222_2$ and $222_3$ are optional and current controller 216, current feedforward 218 and consequently commutator 220 produce a PWM voltage signal.

Position controllers 208, velocity controller 212 and current controller 216 may each be embodied as a polynomial controller such as a Proportional-Integral-Derivative (PID) controller (i.e., similar to position controllers 108, velocity controller 112 and current controller 116 of FIG. 1). Current controller 216 may implement the current control in the Direct-Quadrature space (i.e., also referred to as D-Q control). In Such a case, current sensor 226 produces three parameters (i.e., $I_a$ is a vector) namely $I_d$, $I_q$ and $I_0$. Similarly, each of velocity controller 212 and velocity feedforward 214 also produce three parameters (i.e., $I_c$ and $I_f$ are also vectors of parameters). Furthermore, when controlling the motor in the $I_d$, $I_q$ and $I_0$ space, field weakening may be employed to increase the velocity of the motor above the theoretical no load velocity of the motor with respect to the supply voltage. Field weakening is achieved by setting the target $I_d$ to a negative value, thus reducing the back EMF (i.e., which acts as a braking force) generated by the motor. Similar to shaft encoder 128 (FIG. 1), shaft encoder 228 may be embodied as a mechanical encoder, an optical encoder a magnetic encoder or a capacitive encoder. Alternatively, shaft encoder 228 may employ a measurement of the back EMF as described above.

Figure 3:
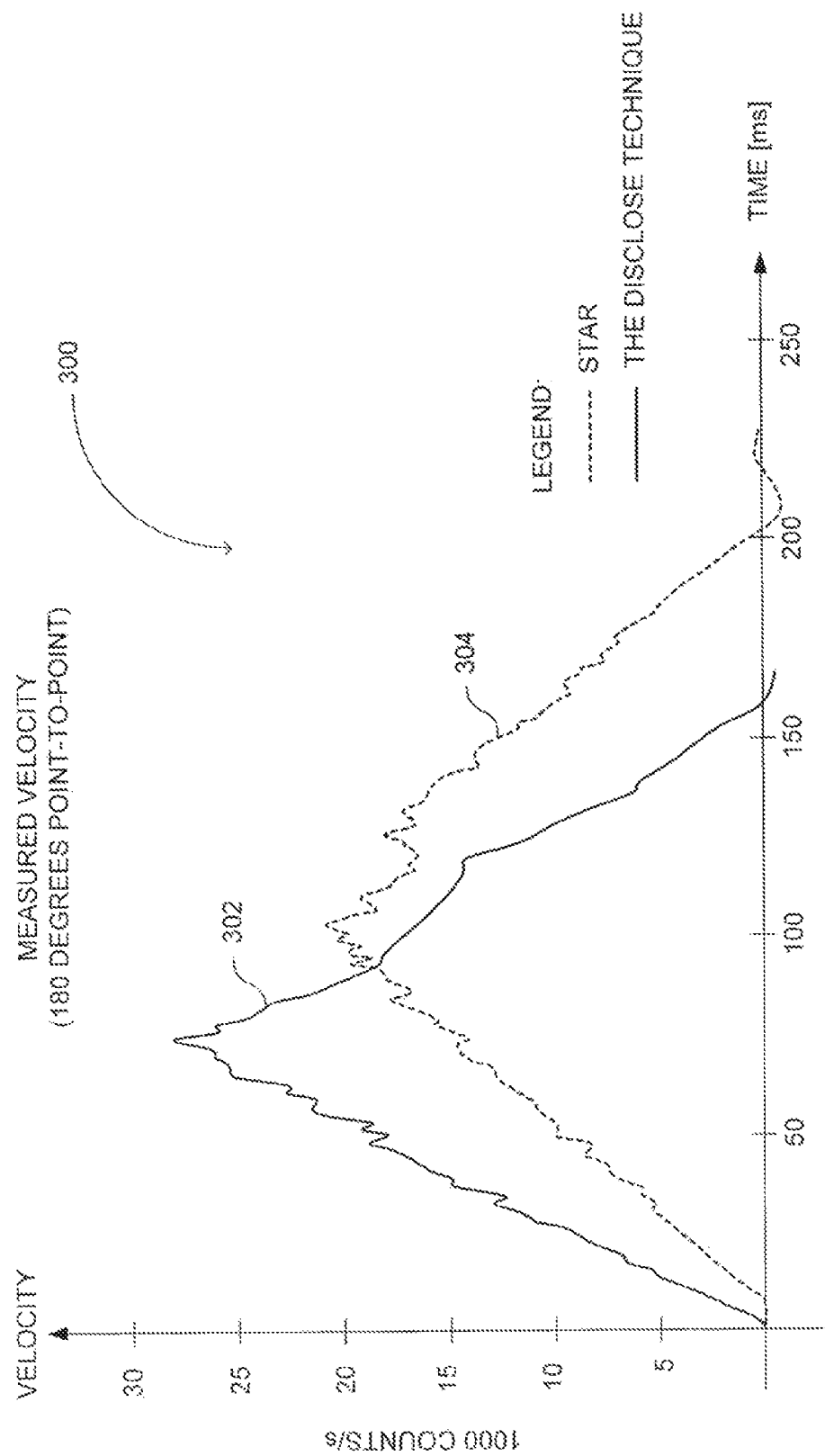
FIG. 3 is a schematic illustration of a graph exhibiting the velocity of a motor, at a mechanical rotation of 180 degrees, when the coils of the motor are independently controlled according to the disclosed technique and when the coils of the motor are connected in a the known in the art star configuration.

Reference is now made to FIG. 3, which is a schematic illustration of an exemplary graph, generally referenced 300, exhibiting the velocity of a motor, at a mechanical point-to-point transition of 180 degrees, when the coils of the motor are independently control according to the disclosed technique and when the coils of the motor are connected in a the known in the art star configuration. The term 'point-to-point' refers herein to the position from which the motor starts the rotation thereof until the position in which the motor comes to a complete stop. Graphic representation 302 represents the measured velocity of the motor with the coils connected in accordance with the disclosed technique. Graphic representation 304 represents the measured velocity of the motor with the coils connected in a star configuration. In graph 300 the horizontal axis represents the time axis measured in milliseconds (abbreviated 'ms' in FIG. 3) and the vertical axis represents the velocity of the motor measured in thousands of shaft encoder counts per second.

In the example set forth in FIG. 3, the acceleration of the motor with the coils independently controlled in accordance with the disclosed technique is approximately double the acceleration of the motor with the coils connected in a star configuration. Since the torque is proportional to the acceleration, this entails that the torque produced by a motor with the coils independently controlled in accordance with the disclosed technique, is approximately double the torque produced by the motor with the coils connected in a star configuration.

Also, the maximum velocity reached by a motor with the coils independently controlled in accordance with the disclosed technique, is higher than the velocity reached by the motor with the coils connected in a star configuration. As is also evident from exemplary graph 300, graphic representation 304 exhibits a trapezoidal shape, which implies that the velocity of the motor in which the coils are connected in a star configuration, has reached the velocity upper bound thereof (i.e., the current control loop is saturated and cannot increase the voltage across the coils). Graphic representation 304 exhibits a triangular shape which implies that, in this example, a motor with coils that are independently controlled in accordance with the disclosed technique has yet to reach the velocity upper bound thereof.

Furthermore, the duration required for the rotor to complete a 180 degrees point-to-point rotation, in a motor where the coils are independently controlled in accordance with the disclosed to technique, shorter by more than 50 milliseconds than in same motor but with the coils connected in a star configuration.

Following is a table exemplifying the above discussed differences, according to the example set forth in FIG. 3.

| | Measured Velocity (180 degrees point-to-point) | |
|---|---|---|
| | Disclosed technique | star |
| Acceleration | 16,000 counts/s$^2$ | 7000 counts/s$^2$ |
| Deceleration | 10,000 counts/s$^2$ | 7000 counts/s$^2$ |
| Maximum Velocity | 28,000 counts/s | 21,000 counts/s |
| Duration | ~160 ms | ~225 ms | s—seconds
ms—milliseconds

The motor control systems according to the disclosed technique, described hereinabove in conjunction with FIGS. 1 and 2, employs a shaft encoder (i.e., shaft encoder 128 of FIG. 1 and shaft encoder 228 of FIG. 2). As mentioned above, the shaft encoder may be embodied as a mechanical encoder, an optical encoder a magnetic encoder (e.g., Hall effect encoder), an inertial encoder or a capacitive encoder located directly on the rotor or read the rotor indirectly (i.e., the shaft encoder is associated with the rotor). For example, when the motor being controlled drives a conveyor belt, an IMU may be located on the conveyor belt (i.e., the shaft encoder reads the rotor indirectly). Since the relationship between the rotational velocity of the shaft and the velocity of the conveyor belt is known (i.e., from the radius of the driving wheel and gear ratios should such exist), the linear velocity of the shaft and consequently the position thereof may be determined according to the measured velocity of the conveyor belt. Specifically, when an inertial encoder is employed, the derivative determinators 130 and 230 depicted in FIGS. 1 and 2 respectively may be omitted and optionally replaced with integrators (for determining velocity and position), depending on the put of the inertial encoder.

Figure 4A:
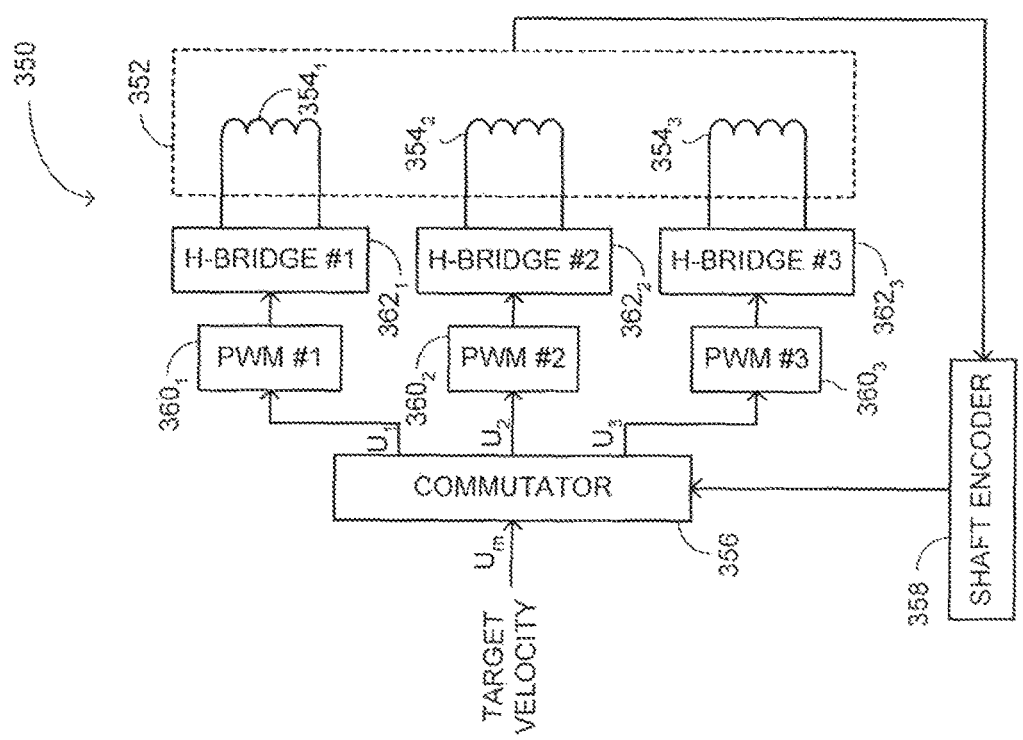
FIGS. 4A-4E are schematic illustrations of a motor control system for driving a motor at a specified velocity or velocity profile, constructed and operative in accordance with a further embodiment of the disclosed technique.
Figure 4B:
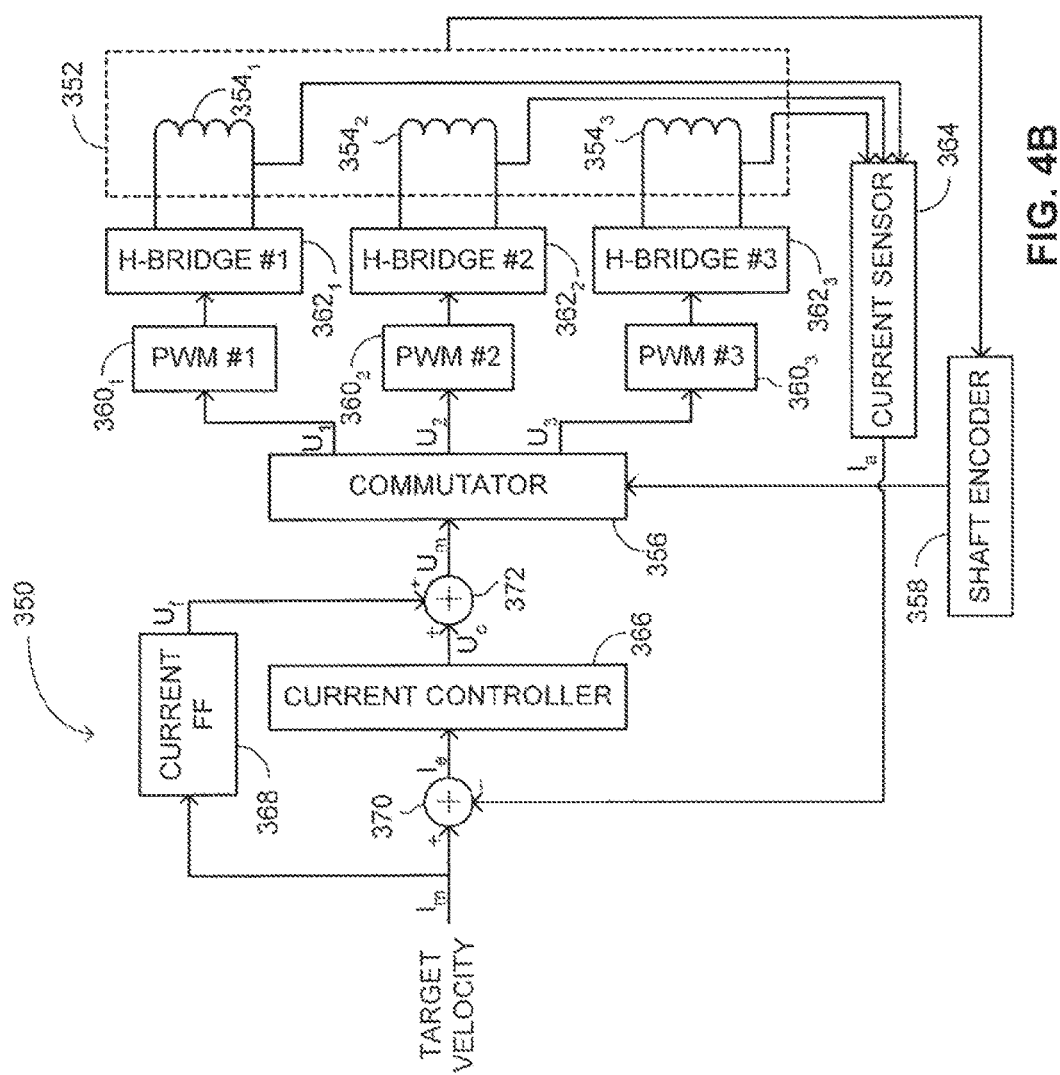
Figure 4C:
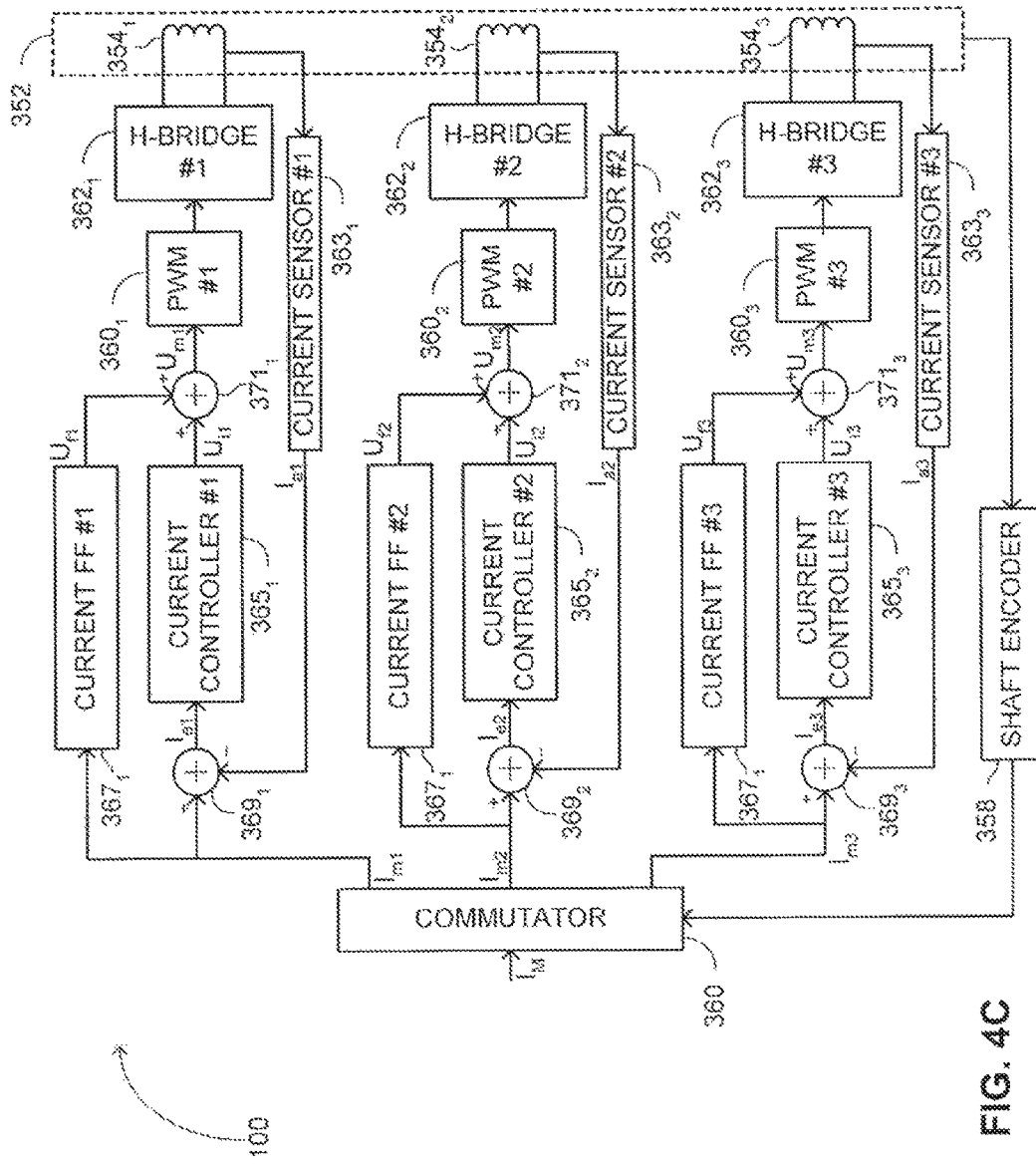
Figure 4D:
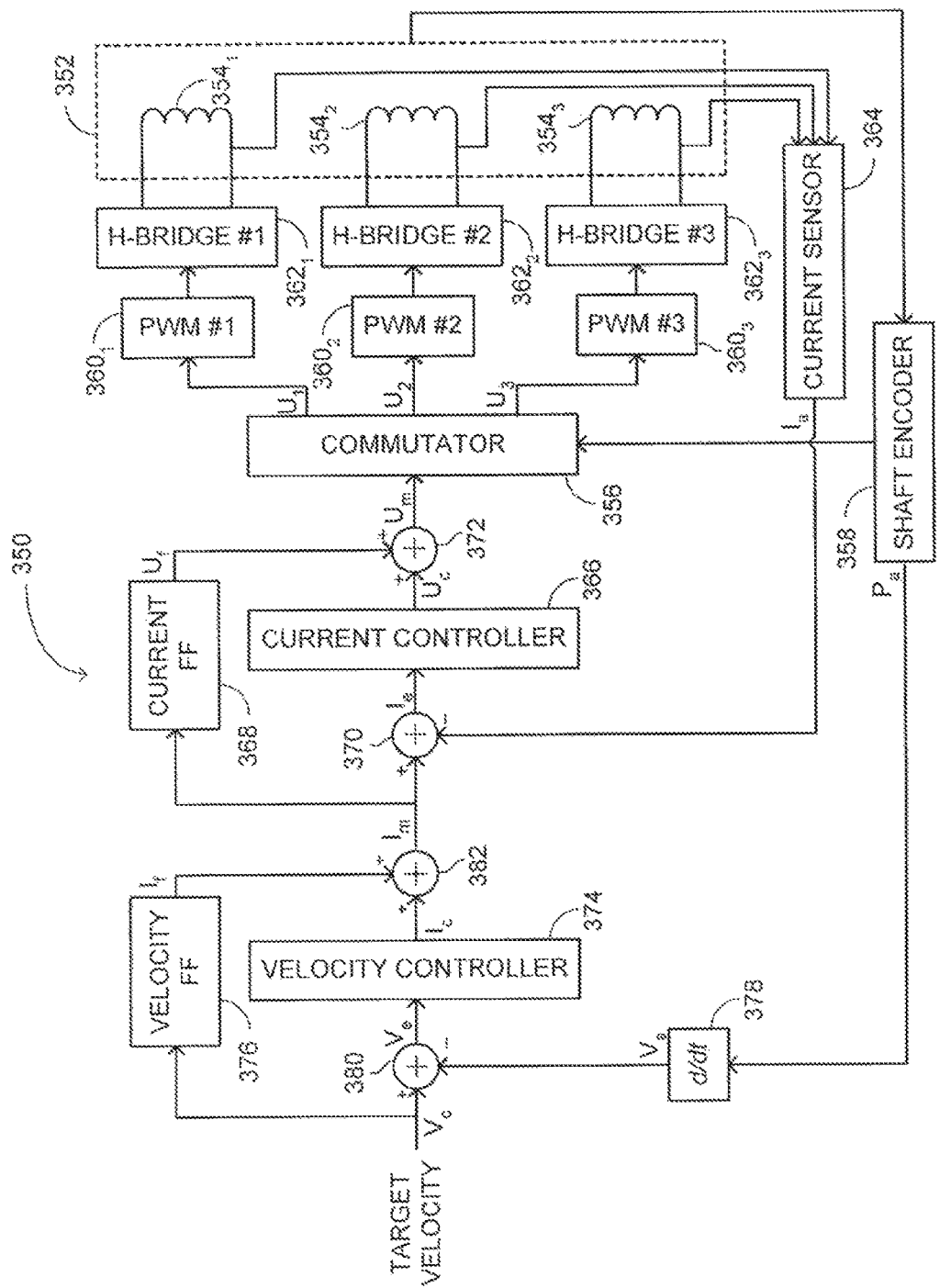
Figure 4E:
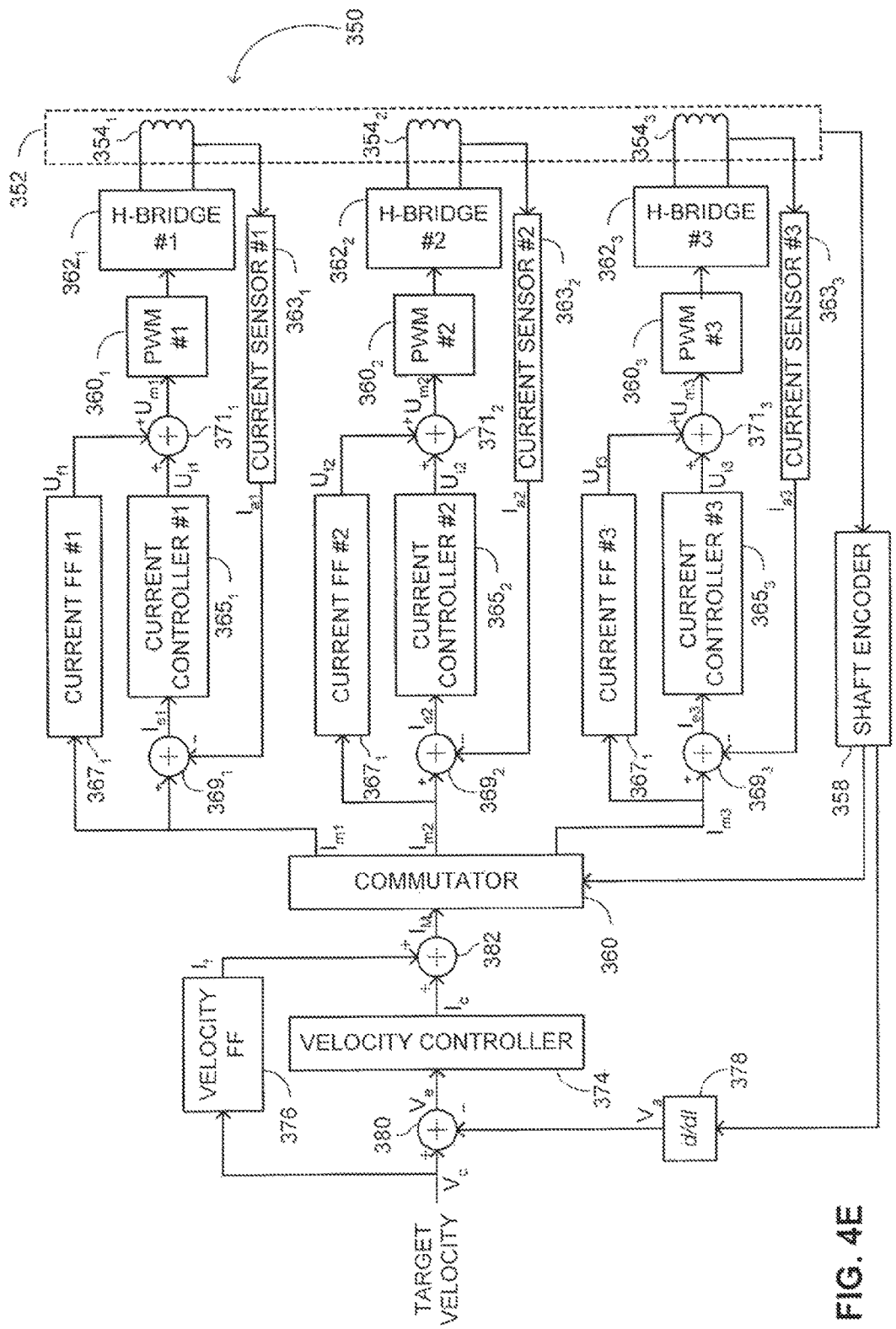

The description hereinabove in conjunction with FIGS. 1 and 2 related to driving the motor from one position to another. Nevertheless, a motor control system according to disclosed technique may be employed for driving the motor at a specified velocity or velocity profile. Reference is now made to FIGS. 4A-4E, which are schematic illustrations of a motor control system, generally referenced 350, for driving a motor at a specified velocity or velocity profile, constructed and operative in accordance with a further embodiment of the disclosed technique. FIG. 4A, depicts a simple configuration of system 350. FIG. 4B depicts systems 350 with a current control loop. FIG. 4C depict system 350 with a current control loop associated with each coil. FIGS. 4D and 4E depict system 350 with a velocity control loop.

With reference to FIG. 4A, system 350 controls a motor 362 which includes at least three coils $354_1$, $354_2$ and $354_3$. System 350 includes a commutator 356, a shaft encoder 358, at least three PWM generators $360_1$, $360_2$, $360_3$, respective of each of coils $354_1$, $354_2$ and $354_3$ and at least three H-bridges $362_1$, $362_2$ and $362_3$ respective of each of coils $354_1$, $354_2$ and $354_3$. Each one of PWM generators $360_1$, $360_2$, $360_3$ is coupled with commutator 356 and with a respective one of H-bridges $362_1$, $362_2$ and $362_3$. The two terminals of each one of coils $354_1$, $354_2$ and $354_3$ is coupled with a respective one of H-bridges $362_1$, $362_2$ and $362_3$. Shaft encoder 358 is coupled the rotor of motor 352 and with commutator 356.

Commutator 356 receives a target velocity in which the motor rotor should rotate. The target velocity may be provided to commutator 356, for example, as a control voltage, $U_m$. Based on the target velocity, commutator 356 determines three voltages $U_1$, $U_2$ and $U_3$ for each one of coils $354_1$, $354_2$ and $354_3$ and divides the voltages $U_1$, $U_2$ and $U_3$ respective of each of coils $354_1$, $354_2$ and $354_3$ according to the rotor position received from shaft encoder 358. Commutator 356 provides each of voltages $U_1$, $U_2$ and $U_3$ to a respective one of PWM generators $360_1$, $380_2$ and $360_3$. Each one of PWMs generators $360_1$, $360_2$ and $360_3$ determines a pulse width modulated signal corresponding to the respective one of voltages $U_1$, $U_2$ and $U_3$ which operates the respective one of H-bridges $362_1$, $362_2$ and $362_3$. Each one of H-bridges $362_1$, $362_2$ and $362_3$ provides the respective pulse width modulated signal to the respective one of coils $354_1$, $354_2$ and $354_3$ at the required polarity.

System 350 may further include a current control loop. With reference to FIG. 4B, system 350 further includes a current sensor 364, a current controller 366, a current feedforward 368 and summers 370 and 372. It is noted that summer 370 and 372 may be located within current controller 366. Current sensor 364 may be a direct current sensor (e.g., shunt sensor) or an indirect current sensor (e.g., a Hall effect sensor). Current sensor 364 is coupled with each one of coils $354_1$, $354_2$ and $354_3$ and with summer 370. The input of current controller 366 is coupled with summer 370 and the output of current controller 366 is coupled with summer 372. Summer 372 is further coupled with the input of commutator 356 and with the output of current feedforward 368.

A target velocity is provided to summer 370 and to current feedforward 368. The target velocity may be provided, for example, as a control current, $I_m$. Furthermore, current sensor 364 determines the instantaneous current in coils coils $354_1$, $354_2$ and $354_3$ and provides this determined current to summer 370. Summer 390 receives the instantaneous current in the coil from current sensor 364 and subtracts this instantaneous current from the control current to produce a current error $I_e$. Current controller 366 determines a voltage command, $U_c$, aimed at minimizing the current error. Current feedforward 368 determines a forward volates, $U_f$, according to the prediction of the voltage required to reach the control current. Current feedforwards 368 determines the respective forward voltage $U_f$ according to the control current, $I_m$, the motor electrical parameters (e.g., resistance inductance and capacitance) and the required electrical velocity of the motor. Summer 372 adds the forward voltage to the command voltage and generates a modified voltage $U_m$. Summer 392 provides the modified voltage for commutator 356.

Alternatively to the configuration depicted in FIG. 4B, System 350 may further include a current control loop respective of each coil. With reference to FIG. 4C, system 350 further includes a current control loop for each coil $354_1$, $354_2$ and $354_3$. Accordingly, system 350 further includes current sensors $366_1$, $366_2$ and $366_3$, current controllers $365_1$, $365_2$ and $365_3$, current feedforwards $367_1$, $367_2$ and $367_3$, summers $369_1$, $369_2$ and $369_3$ and summers $371_1$, $371_2$ and $371_3$ Commutator 360 is coupled with each one of current feed forwards $367_1$, $367_3$ and $367_3$ and with each one of summers $369_1$, $369_3$ and $369_3$ and with shaft encoder 358.

Summer $369_1$ is coupled with current controller $365_1$ and with current sensor $363_1$. Current sensor $363_1$ is further coupled with coil $354_1$. Summer $371_1$ is coupled with current controller $365_1$, with current feedforward $367_1$ and with PWM $358_1$. Summer $369_1$, current controller $365_1$, current feedforward $367_1$ current sensor $363_1$, current controller $365_1$, summer $371_1$, PWM $358_1$ and H-bridge $356_1$ all define a respective current control loop associated with coil $354_1$.

Summer $369_2$ is coupled with current controller $365_2$ and with current sensor $363_2$. Current sensor $363_2$ is further coupled with coil $354_2$. Summer $371_2$ is coupled with current controller $365_2$, with current feedforward $367_2$ and with PWM $358_2$. Summer $369_2$, current controller $336_2$, current feedforward $367_2$, current sensor $363_2$, current controller $365_2$, summer $371_2$, PWM $358_2$ and H-bridge $356_2$ all define a respective current control loop associated with coil $354_2$.

Summer $369_3$ is coupled with current controller $365_3$ and with current sensor $363_3$. Current sensor $363_3$ is further coupled with coil $354_3$. Summer $371_3$ is coupled with current controller $365_3$, with current feedforward $367_3$ and with PWM $358_3$. Summer $369_3$, current controller $365_3$, current feedforward $367_3$, current sensor $363_3$, current controller $365_3$, summer $371_3$, PWM $358_3$ and H-bridge $356_3$ all define a respective current control loop associated with coil $354_3$.

A target velocity is provided to commutator 356 for example as a control current. Commutator 156 determines the respective modified coil currents $I_{m1}$, $I_{m1}$ and $I_{m3}$ for each respective current control loop associated with each one of coils $354_1$, $354_2$ and $354_3$. Commutator 356 divides the modified coil current $I_1$, $I_{m2}$ and $I_{m3}$ between the respective current control loops of coils $354_1$, $354_2$ and $354_3$ according to the rotor position received from shaft encoder 356. Commutator 356 provides modified current $I_{m1}$ to summer $369_1$ and current feedforward $367_1$, modified current $I_{m2}$ to summer $369_2$ and current feedforward $367_2$ and modified current $I_{m3}$ to summer $369_3$ and current feedforward 367.

Each one of summer $369_1$, $369_2$ and $369_3$ receives the respective instantaneous current flowing through the respective coil $154_1$, $154_2$ and $154_3$ from the respective current sensor $363_1$, $363_2$ and $363_3$ and subtracts this instantaneous current from the respective modified current $I_{m1}$, $I_{m2}$ and $I_{m3}$ to produce a respective current error $I_{e1}$, $I_{e2}$ and $I_{e3}$. Each one of current controllers $365_1$, $365_2$ and $365_3$ determines a respective voltage command, $U_{c1}$, $U_{c2}$ and $U_{c3}$, aimed at minimizing the current errors. Each one of current feedforwards $367_1$, $367_2$ and $367_3$ determines a respective forward voltage $U_{f1}$, $U_{f2}$ and $U_{f3}$ according to the prediction of the voltage required to reach the respective modified current $I_{m1}$, $I_{m2}$ and $I_{m3}$. Each one of current feedforwards $367_1$, $367_2$ and $367_3$ determines the respective forward voltage $U_{f1}$, $U_{f2}$ and $U_{f3}$ according to the respective modified current $I_{m1}$, $I_{m2}$ and $I_{m3}$, the motor electrical parameters (e.g., resistance inductance and the Back Electromotive Force—BEMF constant) and the required electrical velocity of the motor (i.e., mechanical velocity divided by the number of magnetic poles of the motor). Each one of summers $371_1$, $371_2$ and $371_3$ adds the respective forward voltage $U_{f1}$, $U_{f2}$ and $U_{f3}$ to the respective command voltage $U_{c1}$, $U_{c2}$ and $U_{c3}$ and generates a respective modified voltage $U_{m1}$, $U_{m2}$ and $U_{m3}$. Each one of summers $371_1$, $371_2$ and $371_3$ provides the respective modified voltage $U_{m1}$, $U_{m2}$ and $U_{m3}$ to the respective one of PWMs $160_1$, $360_2$ and $360_3$.

System 350 may further include a velocity control loop. With reference to FIGS. 4D and 4E, system 350 further includes a velocity controller 374, a velocity feedforward 376, a derivative determinator 378 and summers 380 and 382. Summer 380 and 382 may be located within velocity controller 374. Shaft encoder 358 may be embodied as a mechanical encoder, an optical encoder a magnetic encoder (e.g., Hall effect encoder), an inertial encoder (e.g., are IMU)

or a capacitive encoder located directly on the rotor or read the rotor indirectly. In general, derivative determinator 378 may be omitted or replace with an integrator depending on the output of shaft encoder 358.

Derivative determinator 378 is coupled with the output of shaft encoder 358 and with summer 380. The input of velocity controller is coupled with summer 380 and the output of velocity controller is coupled with summer 382. Summer 382 is further coupled with the output of velocity feedforward 376.

A target velocity is provided to summer 380 and to current feedforward 368. The target velocity, $V_c$, may be provided, for example, as a control current or voltage or as a digital number. Furthermore, derivative determinator 378 determines the instantaneous velocity of the motor rotor and provides this instantaneous velocity to summer 380. Summer 380 subtracts instantaneous velocity from the target velocity to produce a velocity error $V_e$. Velocity controller 374 determines a current command, $I_c$, aimed at minimizing the velocity error. Velocity feedforward 376 determines a forward current, $I_f$ according to the prediction of the current required to reach the target velocity $V_C$. In other words, velocity feedforward 376 provides the required current had an open loop control system been employed (i.e., similar to velocity feedforward 114 of FIG. 1) described above. Summer 382 adds the forward current, $I_f$ to the current command. $I_c$, and generates the modified current signal, $I_m$, provided to summer 378 and to current feedforward 368.

Similar to as mentioned above in conjunction it FIGS. 1 and 2, velocity controller 374 and current controller 366 may each be embodied as a polynomial controller such as a Proportional-Integral-Derivative (PID) controller. Current controller 366 may implement the current control in the Direct-Quadrature space (i.e., also referred to as D-Q control) also similar to as described above. Further as described above, shaft encoder 358 may be embodied as a mechanical encoder, an optical encoder a magnetic encoder, an inertial encoder or a capacitive encoder. Alternatively, shaft encoder 358 may employ a measurement of the back EMF. Also, the target velocity may be determined by a motion profile generator which generates a rotor motion profile. This rotor motion profile describes the rotor velocity, from the current rotor velocity to the target velocity, as a function of time. The Motion profile generator determines the rotor motion profile, for example, according to the difference between the current velocity and the target velocity, information relating to the motor acceleration and deceleration as well as to the maximum speed of the motor. Also velocity controller 374, velocity feedforward 376, commutator 356, current controllers 366, current feedforwards 368, PWMs $360_1$, $360_2$ and $360_3$ and summers 370, 372, 380 and 382 may all be implemented with one of a digital controller, a DSP, discrete components or any combination thereof.

Figure 5A:
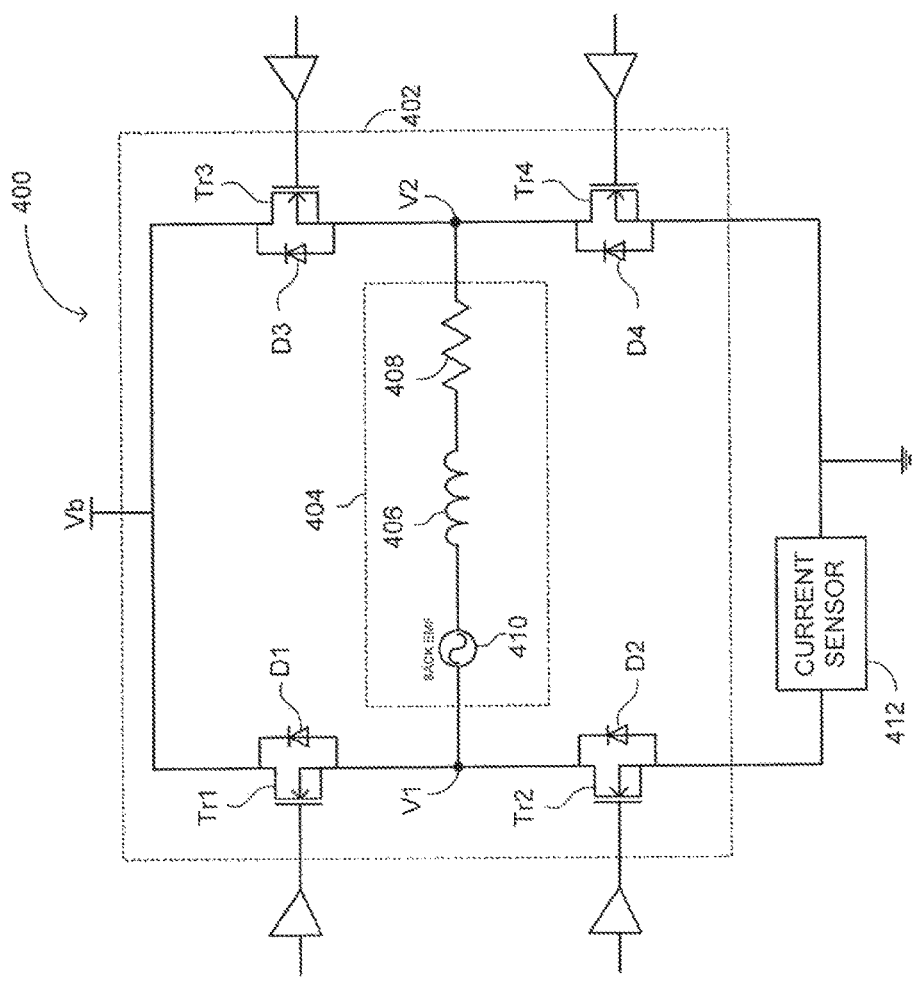
FIGS. 5A-5D are schematic illustrations of motor coil control circuit and modes of operation thereof, constructed and operative in accordance with another embodiment of the disclosed technique.

H-bridges $124_1$, $124_2$ and $124_3$, H-bridges $224_1$, $224_2$ and $224_3$ and H-bridges $362_1$, $362_2$ and $362_3$ may be operated in one of three modes, fast decay mode, slow decay mode and mixed decay mode. The decay mode depends on the operation requirements of the motor as further explained. Reference is now made to FIGS. 5A-5D, which are schematic illustrations of motor coil control circuit, generally referenced 400, and modes of operation thereof, constructed and operative in accordance with another embodiment of the disclosed technique. FIG. 5A depicts a coil control circuit generally referenced 400.

Figure 5C:
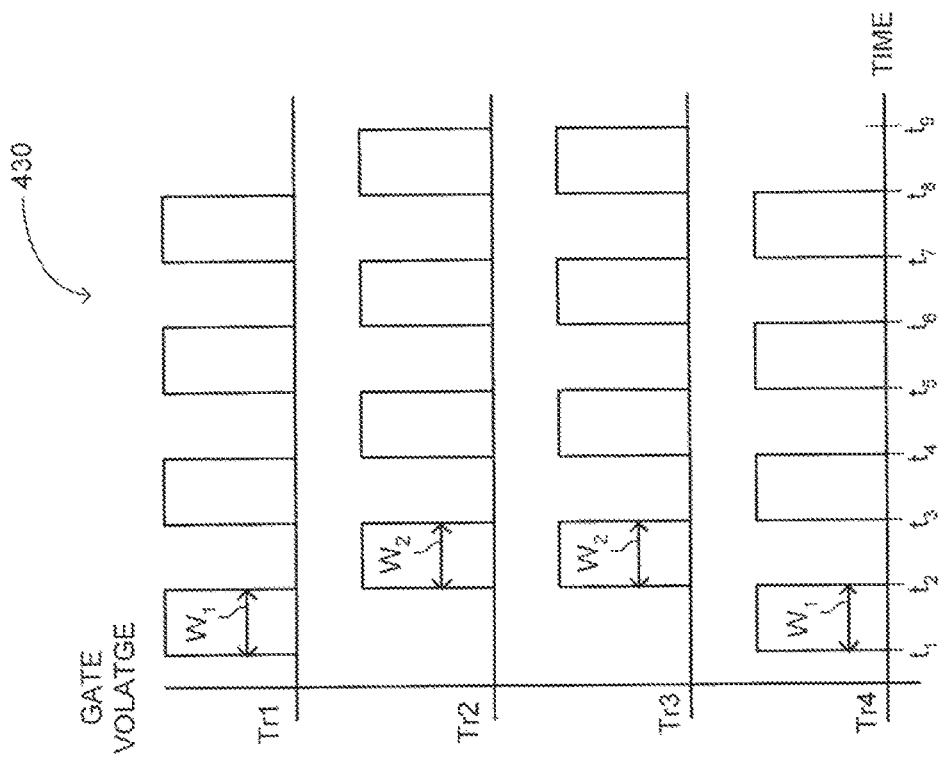
Figure 5B:
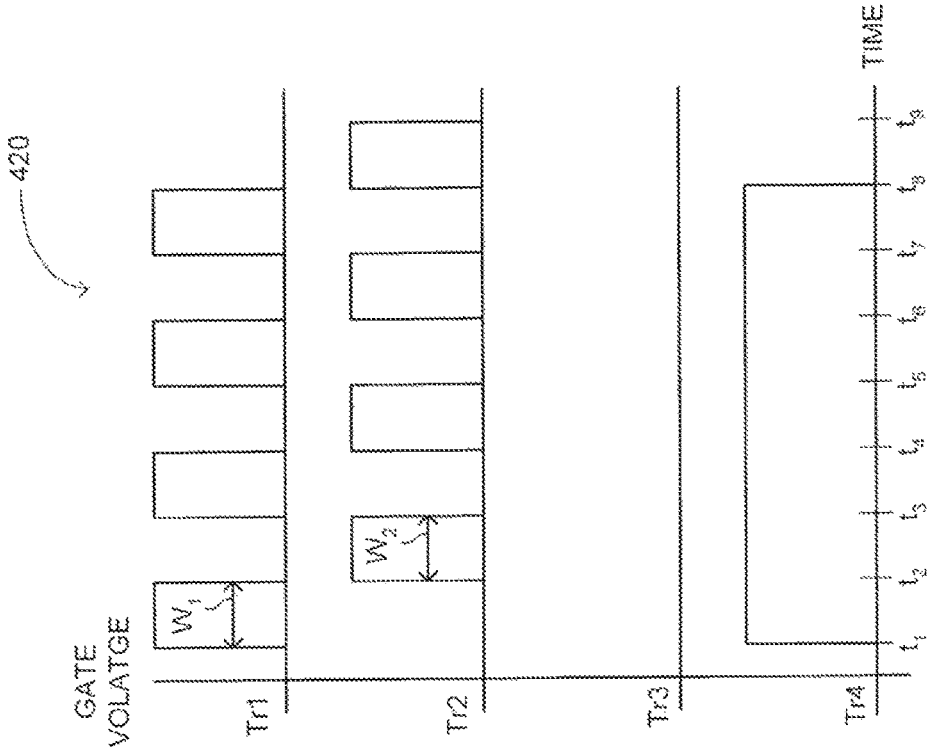

In general, in three phase elect motor, for each full electrical rotation of the rotor, each coil is driven with a first voltage (or current) during a first time interval (referred to herein as the 'forward phase') and with a second, voltage (or current) with a reversed polarity relative to the first voltage (referred to herein as the 'reverse phase') during a second interval, according to the position of the rotor. FIGS. 5B-5C depict pulse width modulated signal diagrams 420, 430 and 440 representing the voltages applied to coil control circuit 400 during the forward phase.

With reference to FIG. 5A, phase control circuit 400 includes an H-bridge 402 driving a motor phase coil 404 and a current sensor 408. Motor phase coil 404 is modeled as an inductor 406, a resistor 408 and a back electromotive force (EMF) generator 410. H-bridge 402 includes four transistors Tr1, Tr2, Tr3 and Tr4 and four diodes D1, D2, D3 and D4. In the following description, transistors Tr1, Tr2, Tr3 and Tr4 are assumed to be N-type transistor. However, it is noted that the description brought herein applies to an H-bridge with P-type transistors as well or with both N-type and P-type. The source of transistor Tr1 is coupled with the drain of Tr2 forming node V1. The source of transistor Tr3 is coupled with the drain of Tr4 forming node V2. The drains of transistors Tr1 and Tr2 are coupled with the supply voltage, Vb. Current sensor 412 is coupled with the source of Transistor Tr2 and with ground. The source of transistor Tr4 is also coupled with ground. One terminal of motor phase coil 404 is coupled with node V1 and the other terminal of motor phase coil 404 is coupled with node V2.

In general, when driving a current through a coil, energy is temporarily stored in the coil in the form of a magnetic field. When the current is stopped, or gradually reduced. This back EMF causes the polarity of the inductor to reverse and to current to flow in the opposite direction. Thus, when the coil is employed for driving a motor, the back EMF shall cause the motor to slow down or event stop. Dissipating the energy stored in the coil affects the speed at which the motor can be driven.

With reference to FIG. 5B and still referring to FIG. 5A, timing diagram 420 represents the pulse width modulated voltage signals applied to the gates of transistors Tr1, Tr2, Tr3 and Tr4 when slow decay mode is employed. Between $t_1$ and $t_2$, a high voltage is applied to the gates of transistors Tr1 and Tr4 and a low voltage (i.e., below the threshold voltage of the transistors) is applied to the gates of Tr2 and Tr3, thus connecting node V1 to the supply voltage, Vb, and node V2 to ground. At time $t_2$, a low voltage (i.e., below the threshold voltage of the transistors) is applied to the gate of transistor Tr1 and a high voltage is applied to the gate of transistor Tr2. The gate of transistor Tr3 is maintained at a low voltage and the gate of transistor Tr4 is maintained at a high voltage. Thus, both nodes V1 and V2 are now connected to ground. Thus, at time $t_2$, the only voltage across the inductor is the back EMF (i.e., $V_{inductor}$=Back EMF). The discharge rate of an inductor is proportional to the voltage across the inductor and the resistance in the circuit. Since the only voltage across the inductor is the Back EMF and the resistance in the circuit is relatively low, inductor 406 discharge at a 'slow' rate (i.e., relative to the discharge rate of fast and mixed decay modes, further explained below). Consequently, inductor 406 may not discharge completely by the time the reverse phase of the coil starts. Thus, the average current through the increases (i.e., relative to the average current in the fast and mixed decay modes) and the rotor rotate at a 'slow' speed (i.e., relative to the rotor speed in the fast and mixed decay modes further explained below). It is noted that the pulse width, $W_1$, of the pulses applied to transistor Tr1 need not be equal to the pulse width, $W_2$, of the pulses applied to transistor Tr2.

With reference to FIG. 5C and still referring to FIG. 5A, timing diagram 420 represents the pulse width modulated voltage signals applied to the gates of Tr1, Tr2, Tr3 and Tr4 when fast decay mode is employed. Between $t_1$ and $t_2$, a high voltage is applied to the gates of Tr1 and Tr4 and a low voltage (i.e., below the threshold voltage of the transistors) is applied to the gates of Tr2 and Tr3, thus connecting node V1 to the supply voltage, Vb, and node V2 to ground. Consequently, a Back EMF develops across inductor. At time $t_2$, a low voltage (i.e., below the threshold voltage of the transistors) is applied to the gates of Tr1 and Tr4 and a high voltage is applied to the gates of transistors Tr2 and Tr3. Thus, node V1 is connected to ground and node V2 is connected to the supply voltage. Thus at time $t_2$, the back EMF adds to the supply voltage Vb (i.e., $V_{inductor}$=Back EMF+Vb). As mentioned above, the discharge rate of an inductor is proportional to the voltage across the inductor and the resistance in the circuit. Since the only voltage across the inductor is the addition of the Back EMF to the supply voltage Vb, inductor 406 discharge at a 'fast' rate (i.e., relative to the discharge rate of the slow decay mode explained above and the mixed decay mode further explained below). Consequently, inductor 406 may discharge completely by the time the reverse phase of the coil starts. Thus, the average current through the inductor is low (i.e., relative average current of the slow decay mode and the mixed decay mode) and the rotor rotates at a 'slow' speed (i.e., relative to the rotor speed of the slow decay mode and the mixed decay mode). It is noted that the pulse width, $W_1$, of the pulses applied to transistors Tr1 and Tr4 need not be equal to the pulse width, $W_2$, of the pulses applied to transistors Tr2 and Tr4.

Figure 5D:
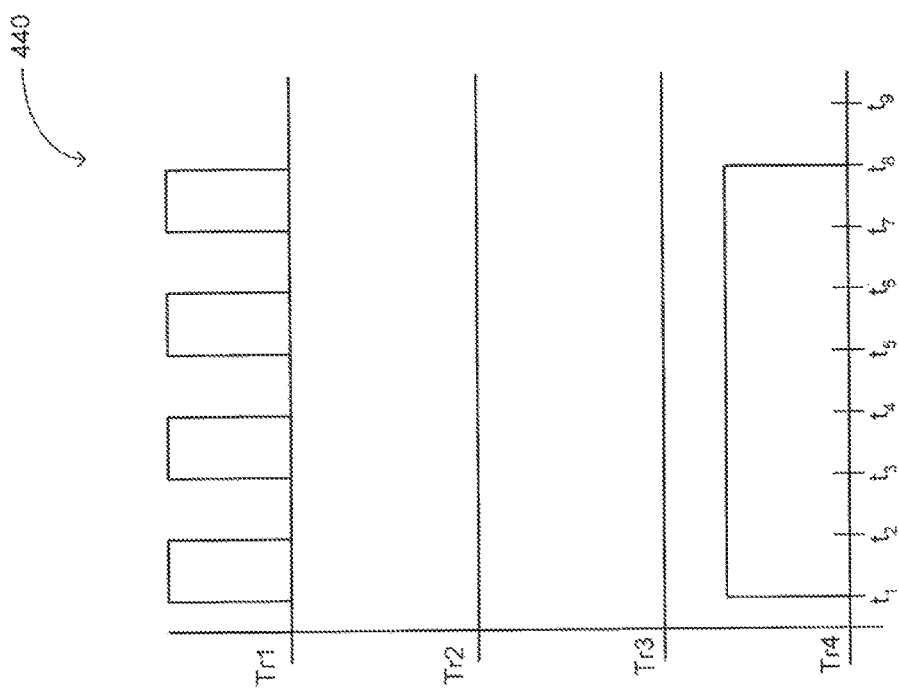

With reference to FIG. 5D and still referring to FIG. 5A, timing diagram 440 represents the pulse width modulated voltage signals applied to the gates of transistors Tr1, Tr2, Tr3 and Tr4 when mixed decay mode is employed. Between $t_1$ and $t_2$, a high voltage is applied to the gates of transistors Tr1 and Tr4 and a low voltage (i.e., below the threshold voltage of the transistors) is applied to the gates of Tr2 and Tr3, thus connecting node V1 to the supply voltage, Vb, and node V2 to ground. At time $t_2$, a low voltage (i.e., below the threshold voltage of the transistors) is applied to the gate of transistor Tr1. The gates of transistor Tr2 and Tr3 are maintained at a low voltage and the gate of transistor Tr4 is maintained at a high voltage. Thus, node V2 is now connected to ground and node V1 is connected to ground via diode D3. Thus, at time $t_2$, the only voltage across the inductor is the back EMF and diode D3 forward voltage (i.e., $V_{inductor}$=Back EMF+$V_{D3}$). As mentioned above, the discharge rate of an inductor is proportional to the voltage across the inductor and the resistance in the circuit. Since the only voltage across the inductor is the Back EMF and the diode forward voltage, the inductor voltage is higher by the forward voltage of diode D3 (i.e., relative to voltage across the inductor in the slow decay), inductor 406 discharge at are intermediate rate (i.e., slower than discharge rate of fast decay mode and faster than discharge rate of the slow decay mode). Consequently, inductor 406 may partially discharge by the time the reverse phase of the coil starts and the average current through the inductor is at an intermediate level (i.e., relative average current of the slow decay mode and the fast decay mode) and the rotor rotates at an intermediate speed (i.e., relative to the rotor speed of the slow decay mode and the fast decay mode). It is noted that the terms 'decay' and 'discharge' are used herein interchangeable and both relate to the dissipation of energy from an inductor.

As mentioned above, timing diagrams 420, 430 and 440 represents the voltages applied coil control circuit 400 during the forward phase. During the reverse phase, transistor Tr1 shall exhibit a PWM voltage signal similar to the forward phase PWM voltage signal of transistor Tr1. Also during the reverse phase, transistor Tr2 shall exhibit a PWM voltage signal similar to the forward phase PWM voltage signal of transistor Tr4. Furthermore, the reverse phase PWM voltage signal of transistor Tr1 shall be similar to the forward phase PWM voltage signal of transistor Tr3 and the reverse phase PWM voltage signal of transistor Tr4 shall be similar to the forward phase PWM voltage signal of transistor Tr2.

It will be appreciated by persons skilled in the art that the disclosed technique is not limited to what has been particularly shown and described hereinabove. Rather the scope of the disclosed technique is defined only by the claims, which follow.

The invention claimed is:

1. A system for controlling an electric motor, said electric motor including at least three coils and a rotor, said system comprising:

a motion profile generator, for generating a rotor motion profile, and for producing a position command according to said rotor motion profile;

a position controller, coupled with said motion profile generator, for determining a velocity command aimed at minimizing a position error between a current position of said rotor and said position command;

a position feedforward, coupled with said motion profile generator, for determining a forward velocity according to a prediction of the velocity required to reach said position command;

a first summer coupled with said position controller and with said position feedforward for producing a modified velocity according to said velocity command and said forward velocity;

a velocity controller, coupled with said first summer, for determining a current command aimed at minimizing a velocity error between an instantaneous velocity of said rotor and said modified velocity;

a velocity feedforward coupled with said first summer, for determining a forward current according to a prediction of the current required to reach said modified velocity;

a second summer coupled with said velocity controller and with said velocity feedforward for producing a modified current according to said current command and said forward current;

a commutator, coupled with said second summer, for determining respective modified coil currents for each one of at least three current control loops, said commutator further dividing said modified coil currents between said at least three current control loops according to the position of said rotor; and said at least three current control loops, each of said at least three current control loop being associated with a respective one of said at least three coils, each current control loop including:

a current controller, coupled with said commutator, for determining a respective voltage command for the respective coil thereof aimed at minimizing a current error between a instantaneous current flowing through the respective one of said at least three and the respective modified coil current; and an h-bridge, coupled with said current controller for providing said voltage command to the respective coil thereof.

2. The system according to claim 1, wherein each of said current control loop further includes:
- a current feedforward, coupled with said commutator, for determining a respective forward voltage according to the respective modified current and motor electrical parameters; and
- a third summer, coupled with said current feedforward and said current controller for producing a modified voltage for the respective coil thereof.

3. The system according to claim 1, wherein each said current control loop further includes a respective current sensor, coupled with said respective coil and with the respective current controller thereof, for determining the instantaneous current flowing through the respective coil.

4. The system according to claim 1, further including a shaft encoder, coupled with said motion profile generator, with said position controller and with said commutator for determining the current position of said rotor and providing said current position of said rotor to said motion profile generator, said position controller and said commutator.

5. The system according to claim 4, further including a velocity determinator, coupled with said shaft encoder and with said velocity controller for determining the instantaneous velocity of said rotor.

6. A system for controlling an electric motor, said electric motor including at least three coils and a rotor, said system comprising:
- a motion profile generator, for generating a rotor motion profile, and for producing a position command according to said rotor motion profile;
- a position controller, coupled with said motion profile generator, for determining a velocity command aimed at minimizing a position error between a current position of said rotor and said position command;
- a position feedforward, coupled with said motion profile generator, for determining a forward velocity according to a prediction of the velocity required to reach said position command;
- a first summer coupled with said position controller and with said position feedforward for producing a modified velocity according to said position command and said forward velocity;
- a velocity controller, coupled with said first summer, for determining a current command aimed at minimizing a velocity error between an instantaneous velocity of said rotor and said modified velocity; a velocity feedforward coupled with said first summer, for determining a forward current according to a prediction of the current required to reach said modified velocity;
- a second summer coupled with said velocity controller and with said velocity feedforward for producing a modified current according to said current command and said forward current;
- a current controller, coupled with said commutator, for determining a respective voltage command aimed at minimizing a current error between an instantaneous current flowing through the respective coils and said modified current;
- a commutator, coupled with said current controller, for determining a respective voltage for each coil and dividing the voltages between said at least three coils; and
- at least three h-bridges, each coupled with a respective coil and with said commutator for providing said voltage command to the respective coil thereof.

7. The system according to claim 6, further including:
- a current feedforward, coupled with said commutator, for determining a respective forward voltage according to the respective modified current and motor electrical parameters; and
- a third summer, coupled with said current feedforward and said current controller for producing a modified voltage.

8. The system according to claim 6, wherein said system further includes a current sensor, coupled with each of said coils and with said current controller, for determining the instantaneous current flowing through said coils.

9. The system according to claim 6, further including a shaft encoder, coupled with said motion profile generator, with said position controller and with said commutator for determining the current position of said rotor and providing said current position of said rotor to said motion profile generator, said position controller and said commutator.

10. The system according to claim 9, further including a velocity determinator, coupled with said shaft encoder and with said velocity controller for determining the instantaneous velocity of said rotor.

* * * * *